United States Patent Office 3,235,983
Patented Feb. 22, 1966

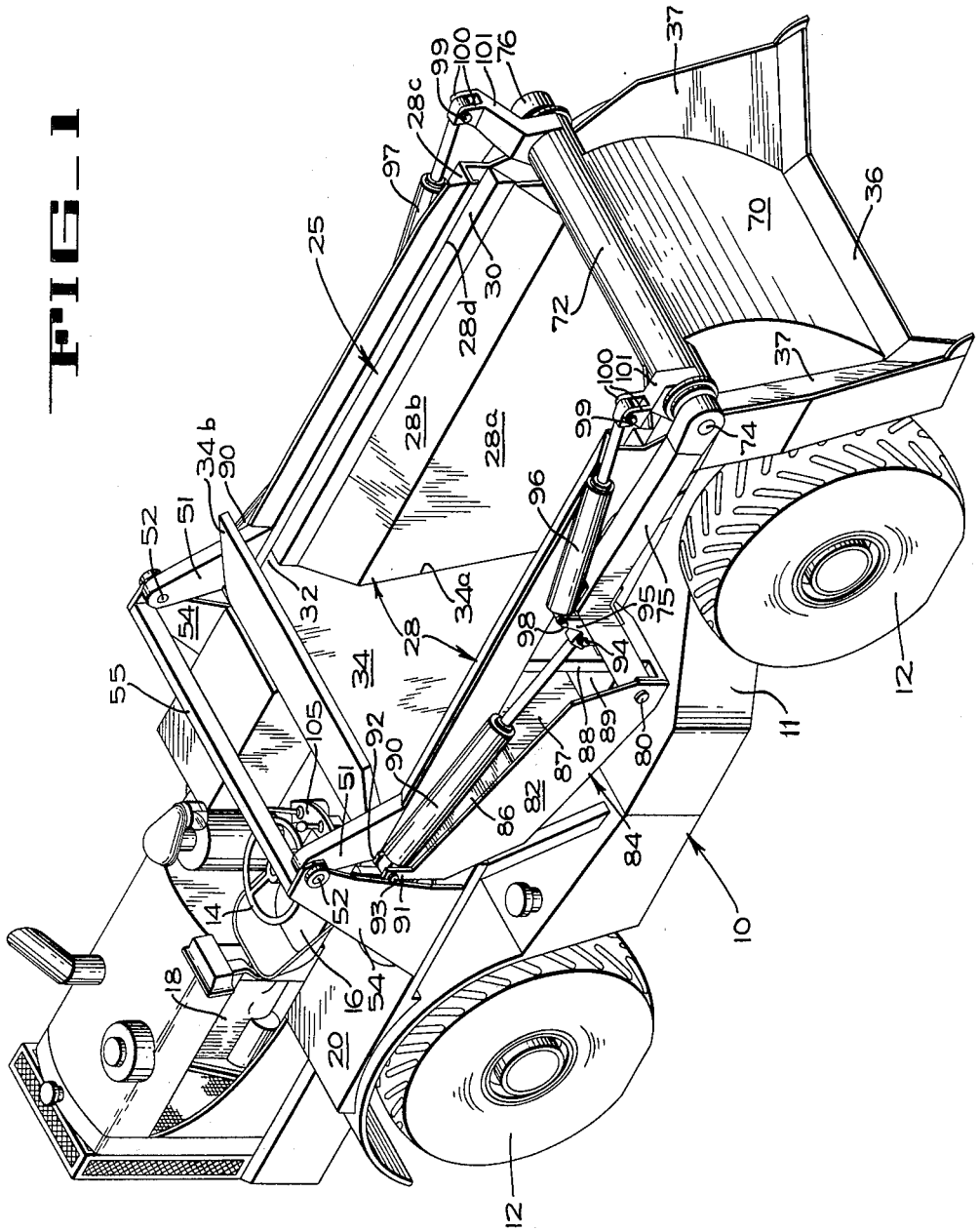

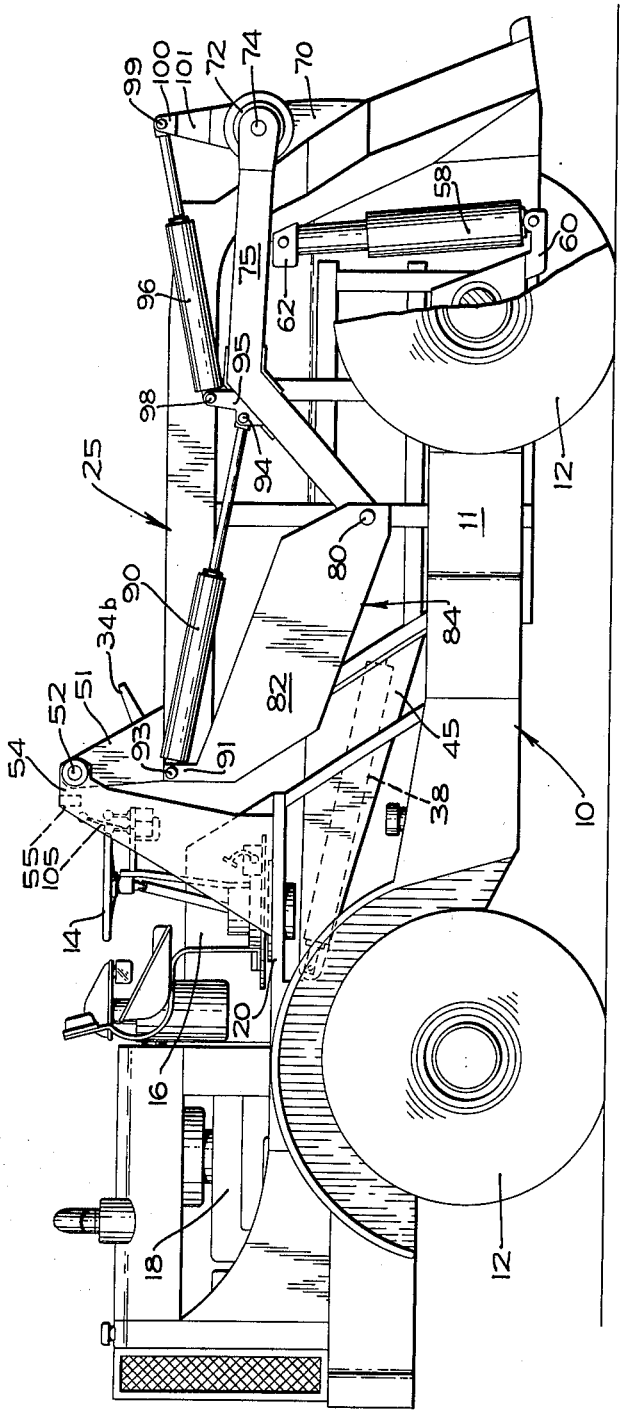

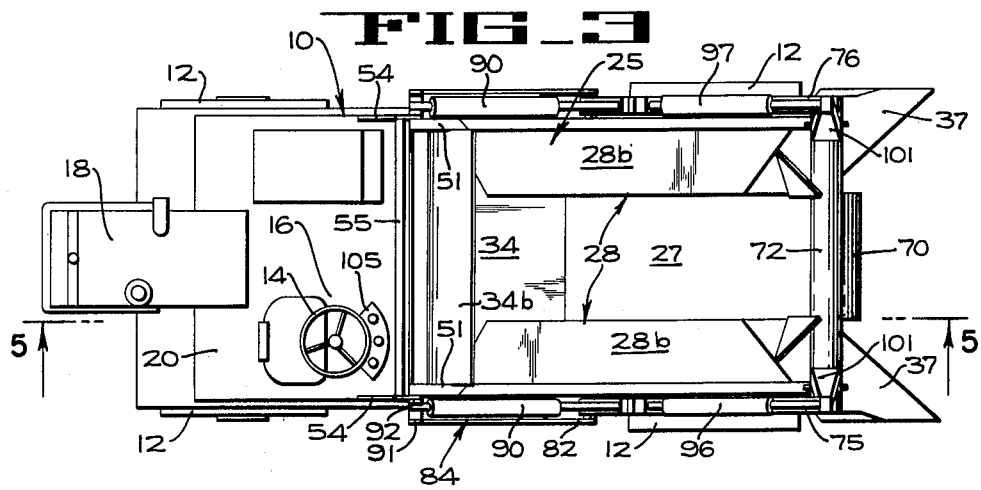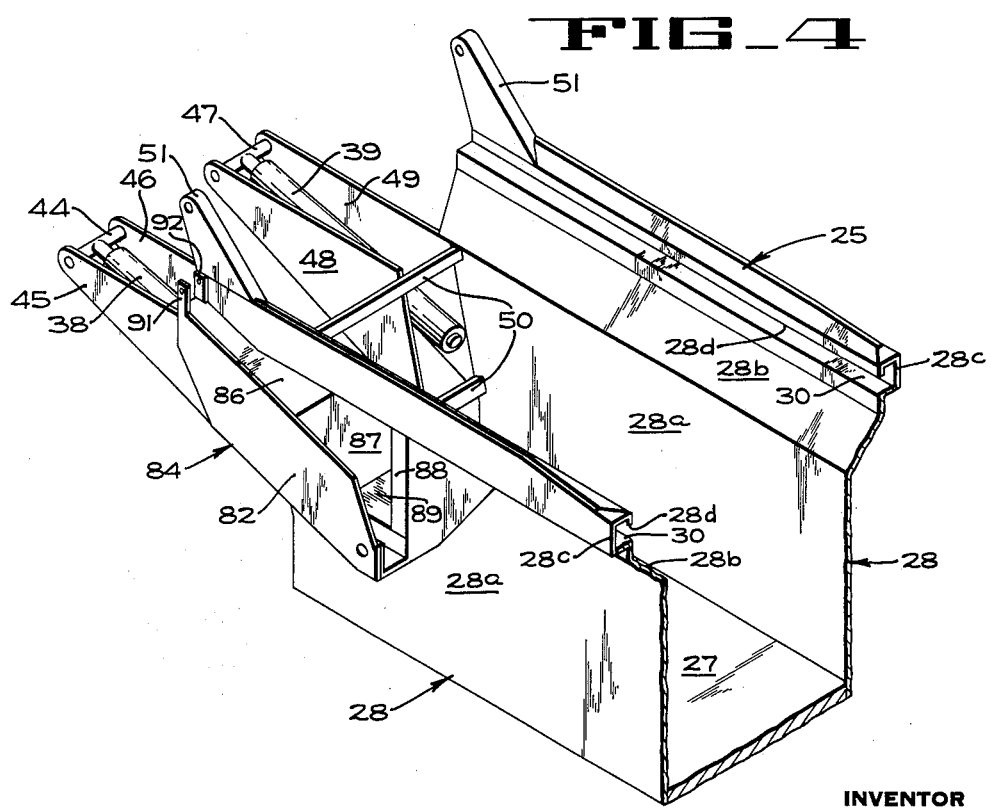

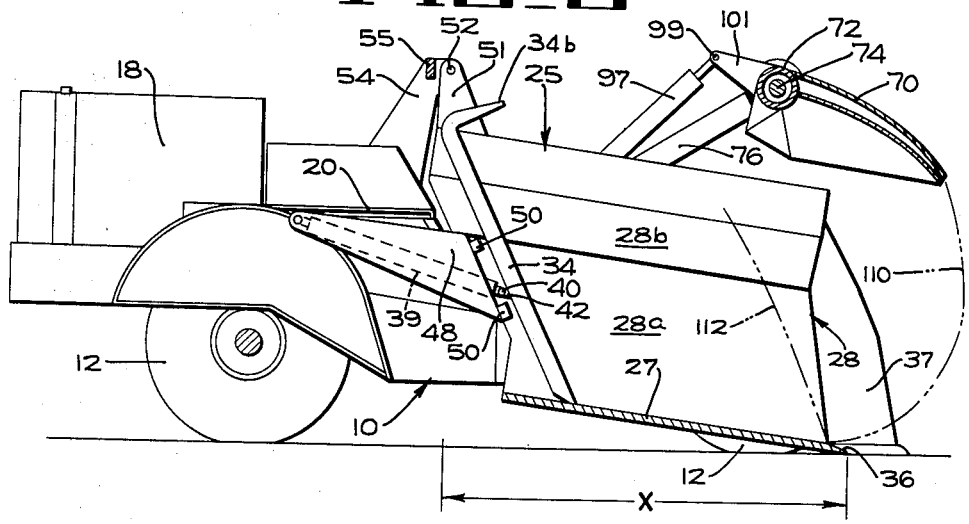
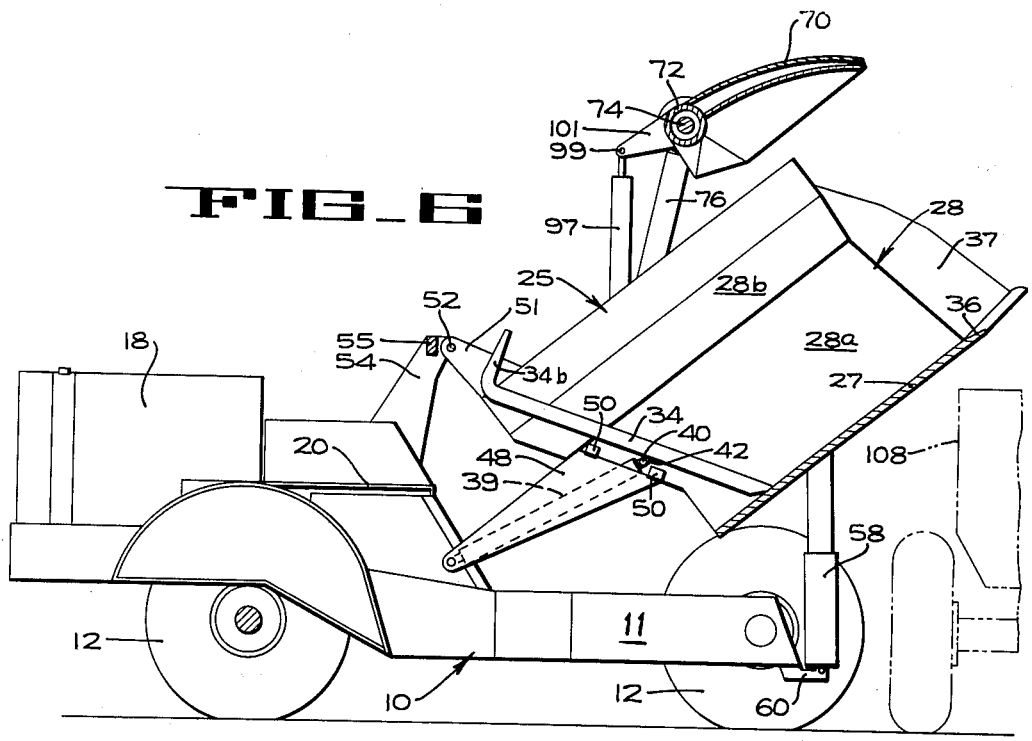

1

3,235,983
EARTH MOVING APPARATUS
William F. Wilson, San Jose, Calif., assignor, by mesne assignments, to Erhard Lauster, Stuttgart-Bad Cannstatt, Germany
Filed May 12, 1960, Ser. No. 28,618
15 Claims. (Cl. 37—126)

This invention pertains to earth-moving equipment and more particularly concerns self loading scrapers.

Various types of machines have been proposed for loading, transporting and discharging quantities of dirt, gravel and the like. Each of these machines is provided with several linkages, lever arrangements, and power cylinders for carrying out the several operations that are necessary when a quantity of dirt or the like is to be scraped or dug up from one position, stored in the hopper of the machine, and discharged at a separate location. Heretofore, due to the multiplicity of levers and linkages it has not been considered possible to arrange the mechanisms of a self-loading scraper so that the discharge end of the storage hopper can be raised to a height adapting it for discharging material into a dump truck or other bulk carrier. Accordingly, at present, self-loading scrapers must also act as the carriers of the material that they scrape from the ground. In instances where the material must be moved to a distant location, it becomes impractical to use a self-loading scraper since, under such conditions this relatively expensive machine will be used for long periods of time as a simple dump truck.

Accordingly, it is an object of the present invention to provide a self-loading scraper that is capable of being used as a loader for delivering the scraped-up material to a dump truck.

Another object is to provide an improved hopper construction and mounting for a self loading scraper.

Another object is to provide a loader that is so arranged that the load in the hopper is raised only a short distance vertically as the hopper is moved to discharge position.

Another object is to provide a loader in which the center of gravity of the load in the hopper is shifted only a short distance during movement of the hopper to discharge position.

Other and further features and advantages of the present invention will be apparent from the following description taken in connection with the accompanying drawings, in which:

FIGURE 1 is a perspective of the improved combination scraper-loader of the present invention.

FIGURE 2 is a side elevation, with parts broken away, of the machine of FIGURE 1.

FIGURE 3 is a diagrammatic plan of the machine of FIGURE 1, drawn at a reduced scale.

FIGURE 4 is a perspective of the hopper of the machine shown removed from the vehicle with the parts at the rear end of the hopper broken away.

FIGURE 5 is an enlarged diagrammatic section taken on line 5—5 of FIGURE 3 with one of several possible paths of movement of the loading blade indicated in phantom lines.

FIGURE 6 is a vertical section, similar to FIG. 5, showing the vehicle being used to discharge material into a carrier which is partially indicated in phantom lines.

The machine comprises a frame 10 (FIGS. 1 and 2) which is made up of steel structural members and steel plates including longitudinally extending spaced side portions 11 welded together to form a rigid, strong support structure. The frame is supported on four road wheels 12 (FIG. 3), the forward pair of wheels being steerable wheels controlled by a steering wheel 14 in the operator's compartment 16. Both pairs of wheels are driven through a suitable transmission and drive shaft (not shown) by an internal combustion engine 18 disposed at the forward end of the vehicle. A horizontal floor is provided for the operator's compartment in the form of a relatively thick steel plate 20 that is secured, as by welding, to the frame 10.

A hopper 25, which is carried at the rear of the vehicle, is open at both ends and has a generally U-shaped transverse cross-section, being made up of a flat base plate 27 (FIG. 4) and two opposed side walls 28. Each of the side walls 28 includes a vertical wall portion 28a an outwardly flared portion 28b, and an upper box-like sill 28c which has an elongate slot 28d on its inner wall. The interior of each sill 28c provides a guide passageway 30 which receives a roller (not shown) that is mounted adjacent the end of an arm 32 (FIG. 1) projecting outwardly from a push-off plate 34 which has a rearwardly directed upper end portion 34b. The side edges 34a (one only being shown) of the plate 34 conform closely to the configuration of the side walls of the hopper 25 so that, when the push-off plate is moved toward the rear end of the hopper, substantially all of the material in the hopper will be discharged. A digging and scraping blade 36 is formed on the rear edge of the bottom plate 27 and each side wall is provided with an outwardly flared apron 37 which directs material into the hopper.

As best seen in FIG. 5, the push-off plate 34 is disposed in an inclined position in the hopper and is reciprocated between the open ends of the hopper by means of two double acting hydraulic cylinders 38 and 39, (FIG. 4). The rearward end of each cylinder is pivotally connected as by pin 40 (FIG. 5) to a flange 42 projecting forwardly from the push-off plate 34. At its forward end, the cylinder 38 is pivotally connected to a rod 44 (FIG. 4) that is rigidly secured between two plates 45 and 46, and the cylinder 39 is pivotally connected to a rod 47 secured between two plates 48 and 49. Each of the plates 45 and 49 is welded or otherwise secured to one of the side walls of the hopper 25 and projects forward therefrom substantially in the plane of the wall. The plates 46 and 48 are secured to two cross bars 50 that extend between the side walls of the hopper adjacent its forward end.

Referring to FIGURES 5 and 6, it will be noted that, since the four support plates 45, 46, 48 and 49 and the rods 44 and 47 are part of the hopper, the upward pivoting movement of the hopper does not affect the operation of the power cylinders as they reciprocate the push-off plate in the hopper.

Each of the side walls of the hopper 25 is provided at its forward end with an upstanding plate 51 (FIG. 1) which is pivotally connected to a stub shaft 52 fixed to a support plate 54 that is rigidly secured to and projects upwardly from the floor of the cab. The two support plates 54 are interconnected by a cross bar 55. As seen in FIG. 6, the stub shafts 52 provide an elevated pivot axis for the hopper and as a result, when the hopper is swung upwardly by two hydraulic power cylinders 58 (one only being shown in FIGS. 2 and 6), the discharge end of the hopper is raised to a point higher than the upper end of the side walls of the hopper of the usual commercial material carriers such as dump trucks.

The two power cylinders 58 are mounted on opposite sides of the hopper 25 and each cylinder is pivotally connected at its lower end to a rigid member 60 (FIG. 2) mounted on the adjacent side portion 11 of the frame 10, and at its upper end, to a lifting pad 62 welded to the side wall of the hopper. The cylinders 58 are of the telescoping type which have long operating strokes. Accordingly, by proper manipulations of the cylinders 58, the hopper 25 may be moved to the elevated position of FIGURE 6, the scraping position of FIG. 5, the transporting position of FIG. 2, or to a digging position approximately six inches below the scraping position of FIG. 5 that positions the digging blade 36 for making a digging cut into the ground as the machine is advanced. A loading blade 70 (FIG. 1), which is mounted at the rear of the hopper, has a curved scoop-like body and is provided at its upper end with an integrally formed tubular member 72. The member has internal bushings (not shown) which pivotally support the member 72 on a rod 74 that is fixed at its opposite ends in two lifter arms 75 and 76 (FIGS. 1 and 3), one arm being disposed at each side of the hopper. The arms 75 and 76 are identical and each is mounted on the frame 10 in the same way. Accordingly, a description of the mounting of arm 75 will serve to disclose the mounting of the arm 76 also. At its forward end, arm 75 is pivotally mounted on a pin 80 that is fixed in one wall 82 of a support housing 84 that is mounted in fixed position on the frame 10. The housing 84 (FIG. 4) is made up of the vertical wall 82, a slanted upper wall 86, spaced vertical walls 87 and 88, and a horizontal base 89, all members being made of steel plate and welded together to form a rigid structure. To rigidly secure the housing 84 to the hopper, the plates 86, 87, 88 and 89 are welded along their inner end edges to the wall 28a of the hopper, and the plates 87 and 88 are welded along a portion of their upper edges to the undersurface of the slanted wall portion 28b of the hopper.

Each of the arms 75 and 76 is oscillated about its pivot pin by a separate double acting hydraulic power cylinder 90 (FIG. 3). Each cylinder 90 is pivotally mounted at its forward end on a pin 93 extending between a pair of upstanding ears 91 and 92 (FIG. 4), the ear 91 projecting upwardly from the associated support housing 84 and the ear 92 being welded to a side wall of the sill 28c. At its rearward end, each power cylinder 90 is pivotally connected by a pin 94 (FIG. 1) to a flange 95 of the associated lifting arm 75 or 76. Accordingly, by simultaneously energizing the power cylinders 90, the lifter arms 75 and 76 can be oscillated to raise and lower the rod 74 on which the loading blade 70 is carried.

The blade 70 may be pivoted relative to the lifter arms 75 and 76 by means of two double acting power cylinders 96 and 97 (FIG. 1). Each cylinder has one end pivoted at 98 on one of the lifter arms 75 or 76 and has its opposite end pivotally disposed on a pin 99 carried in spaced ears 100 formed on the end of an arm 101 projecting outwardly from the tubular support member 72 of the loading blade. By simultaneous manipulation of the two cylinders 96 and 97, the loading blade can be pivoted about the axis of shaft 74 to change its orientation relative to the lifter arms.

A suitable course (not shown) of pressurized fluid for the several hydraulic cylinders is mounted on the frame 10 and it will be understood that the usual hydraulic lines and fittings are provided for the entire control system including the power cylinders. A set of control levers 105 (FIG. 1) which are arranged to control the various movements of the scraper-loader and its mechanisms, are mounted within easy reach of the operator.

To dig or scrape a quantity of material from the ground and load it into a dump truck 108 (FIG. 6), the lifter arms 75 and 76 are first swung upwardly to bring the loading blade 70 to an elevated position as shown in FIG. 5. The power cylinders 96 and 97 may be manipulated to swing the blade counterclockwise about the axis of shaft 74 to an outwardly reaching position. The power cylinders 58 are then actuated to lower the hopper 25 to the scraping position of FIGURE 5 or to the still lower digging position. The vehicle is then driven into the pile of gravel causing a charge of gravel to be forced into the hopper to form an initial charge. The lifter arms 75 and 76 may then be swung downwardly and the blade pivoted clockwise about shaft 74, causing the outer end of the blade to describe a path approximately as show by phantom line 110. It will be evident that the indicated path 110 of the blade may be varied since the loading blade may be independently swung to different angular positions relative to the lifter arms.

As the loading blade 70 moves downwardly, it cuts into the pile of gravel disposed immediately in front of the hopper and forces an additional charge of gravel into the hopper. To move the gravel toward the forward end of the hopper, the lifter arms are once more swung upwardly, causing the tip of the blade to follow a path approximately indicated by phantom line 112. Again, since the blade can be swung about shaft 74 as the lifter arms are raised, the path of movement of the blade may be varied. If desired, the blade 70 may be swung clockwise from the position of FIGURE 1 before the lifter arms are raised so that the upper portion of the charge in the hopper will be thrown toward the forward end of the hopper. Then the lifter arms can be raised preparatory to making another loading stroke. It is to be particularly noted that, if the blade is moved upward along path 112 or a similar path, the upper portion of the charge will be skimmed off the pile and moved upwardly along that path also. As the gravel reaches the top of the pile, it will run off the blade and gravitate down the rear surface of the pile toward the forward end of the hopper. It is evident therefore that successive loading strokes of the blade 70 will cause the hopper to be filled and that this filling operation may be carried out without bodily moving the pile.

When the hopper is filled, the blade is moved to the hopper-closing position of FIGURE 1 and the power cylinders 58 are energized to raise the hopper to the position of FIGURE 6. With the hopper in this elevated position, the lifter arms are actuated and the loading blade is pivoted on shaft 74 until the blade is moved away from the discharge end of the hopper. The vehicle is moved to a position adjacent to the dump truck 108 or the truck is moved to a position under the discharge end of the hopper. The power cylinders 38 and 39 are then energized to move the push-off plate 34 toward the discharge end of the hopper to eject the gravel from the hopper. When the gravel is completely discharged, the push-off plate is retracted and the hopper is lowered to the scraping position of FIGURE 5 ready for the next hopper-filling operation.

Referring to FIG. 6 it is to be noted that, since the side walls of the usual commercial dump truck are about eight feet above the ground G, the lower edge of the discharge end of the hopper must be raised to a point about ten feet above the ground. In the disclosed embodiment, the desired elevation of the hopper is attained by locating the pivot shaft 52 approximately eight feet above the ground. The positioning of the shaft 52 will vary with the distance that the discharge end of the hopper is from the shaft 52. In the present machine, this distance, measured longitudinally of the machine and indicated by reference letter X in FIG. 5 is approximately eleven feet six inches.

The fact that the pusher plate power cylinders 38 and 39 are anchored on the hopper itself makes possible the reciprocating movement of the pusher plate over its full range in the hopper with no binding or cocking of the linkages. With this arrangement, the cylinders 38 and 39, which are preferably of the telescoping type, are required to pivot through only a small angle as they apply pressure to the pusher plate 34 throughout the entire movement of the plate.

Also, the mounting of the lifter arms 75 and 76 on the hopper itself eliminates any need for adjusting the position of the lifter arms and the loading blade 70 when the hopper is elevated, since raising and lowering of the hopper has no effect on the position of the lifter arms on the hopper. Thus, if the loading blade 70 is put into a particular position, as for example the position of FIG. 1 closing the discharge end of the hopper, the blade will remain in this position during raising and lowering of the lifter arms.

It is to be noted also, in FIG. 2, that the pivot pin 80 of the lifter arms 75 and 76 (not shown) is so located and the length of the arms is so chosen that upward pivoting movement of the lifter arms causes the blade mounting rod 74 to move in an arcuate path close to the edges of the hopper walls so that the loading blade can swing into the hopper to move material toward the forward end of the hopper.

Further, as seen in FIG. 3, each lifter arm 75 or 76 is mounted in substantially the same vertical plane as a blade control power cylinder 96 or 97 and a lifter arm control cylinder 90. This superposing of these members at each side of the hopper provides a particularly compact arrangement that makes possible a hopper that is wide enough to receive a load of material of relatively large size and is equipped with all the linkages necessary for efficiently loading material into the hopper.

Another important feature of the invention is the fact that, when using the machine as a loader, it is not necessary to elevate the load an excess amount to place it in position for unloading. Comparing the operating positions of FIGURES 5 and 6, it will be seen that the center of gravity of a load of material in the hopper is raised only a few feet from the position of FIG. 5 to the unloading position of FIG. 6 wherein the scraper blade, which defines the discharge end of the hopper, is approximately 10 feet above the ground. In the usual loaders, the entire load is raised to a point above the upper edges of the walls of the receptacle and then dropped, more or less as a unit, down into the receptacle. In using the present machine, only a portion of the load is raised above the discharge elevation and then, by means of the pusher plate 34, the load is progressively and smoothly discharged into the dump truck with a minimum of shock to the mounting of the truck. It is desirable that the hopper be so proportioned and the pivot shaft 52 be so located that the center of gravity of the lifted load is concentrated substantially over the rear wheels and preferably forwardly of the axis of rotation of the rear wheels so that the load will not overhang the rear end of the vehicle and create an unstable condition of the vehicle during unloading.

Having thus described the invention, what is claimed as new and desired to be protected by Letters Patent is:

1. A vehicle comprising a wheeled support structure, an open ended hopper having a planar floor and being mounted on said structure for pivotal movement about a horizontal axis intermediate the ends of said structure and intersecting the upper forward end of said hopper, a push-off plate slidably mounted in said hopper, a loading blade disposed at the discharge end of said hopper, means on said hopper mounting said blade for movement into said hopper to move material forwardly in the hopper, power means for pivoting said hopper about said axis to raise the discharge end of the floor of said hopper higher than said pivot axis, and means connected between said hopper and said push-off plate for sliding said push-off plate toward the discharge end of said hopper to progressively push material from said hopper while it is in elevated position.

2. An earth moving vehicle comprising a wheeled support structure having a pair of front wheels and a pair of rear wheels, a hopper disposed on said structure having a floor and a rear portion normally positioned between said rear wheels, means pivotally mounting the upper forward end of said hopper at an elevated position above said structure, and power elevating means operatively connected between said rear portion of said structure and the rear portion of said hopper and arranged when actuated to swing said hopper upwardly about said pivot means to an upwardly inclined position, the rear edge of said floor being vertically movable to a point higher than said pivotal mounting.

3. An earth moving vehicle comprising a wheeled support structure, means providing a control cab on the forward end of said structure and in spaced relation thereabove, vertical support members projecting upwardly and rearwardly from said cab and having means providing an elevated pivot axis, a hopper disposed on said support structure, means mounting the upper forward end of said hopper for pivoting movement about said elevated pivot axis, said hopper having a rearward end overlying the end of said structure, a pair of plate-like flanges connected to and projecting forward from said hopper into the space between said cab and said support structure, a bar secured between said flanges, a pusher plate mounted for reciprocating movement in said hopper, a power cylinder connected between said bar and said pusher plate for reciprocating said plate in said hopper, and power means connected between said structure and the rearward end of said hopper and arranged to swing said hopper, said pusher plate and said power cylinder upwardly about said elevated pivot axis.

4. An earth moving vehicle comprising a wheeled support structure, a hopper supported on said structure and having a forward end disposed intermediate the ends of said structure and having an open rearward end disposed adjacent the rearward end of said structure, a plate disposed in upright position in said hopper and mounted for movement from a position adjacent the forward end of said hopper to a position adjacent the rearward end to push material out the open rearward end of said hopper, mounting means at the upper forward end of said hopper, means pivotally connecting said hopper mounting means to said support structure for pivoting movement about a horizontal axis located adjacent the upper forward ends of the side walls of the hopper, first power means connected between said support structure and said hopper for pivoting said hopper about said axis to elevate the rearward open end of said hopper from a position in which the rear edge of the hopper floor is below grade to a position in which the rear edge of the floor is above said axis and the hopper is upwardly inclined from said axis, and second power means connected between said hopper and said slidable pusher plate for moving said plate rearwardly while the rearward end of the hopper is elevated to force material in said hopper out the open rearward end thereof.

5. An earth moving vehicle comprising a wheeled support structure, a hopper supported on said structure having a rear portion substantially overlying the rear end of the vehicle, a scraper blade on said rear portion, fixed pivot means mounting the upper forward end of said hopper on said structure for movement between a lowered position wherein said scraper blade is contiguous to the ground and a raised position wherein the blade is elevated at least eight feet above the ground, a loading blade pivotally mounted on said hopper for moving material into the hopper, and power means carried by said hopper and connected to said loading blade for actuating said blade to compact material in said hopper at any hopper elevation.

6. An earth moving vehicle comprising a wheeled support structure having rearwardly extending spaced side portions, a hopper provided with upstanding side walls and movable from a position between said spaced side portions to a position upwardly inclined toward the rear of the vehicle and spaced above said spaced side portions, an upstanding hopper support plate secured to the upper edge of each said side walls adjacent the front of the hopper, and means mounted on said support structure defining a common horizontal pivot axis for the upper portion of said hopper support plates, the upper edge of said hopper being at an elevation lower than said pivot axis when said hopper is positioned between said spaced side portions.

7. An earth moving vehicle comprising an elongate wheeled support structure, vertical support members mounted upon said support structure and having means providing an elevated horizontal pivot axis extending transversely above said support structure, a hopper carried by said vertical support members, means mounting the upper forward end of said hopper for pivotal movement about said pivot axis, said hopper having an open rearward end overlying the end of said support structure, a plate-like flange connected to and projecting forwardly from said hopper, a bar secured to said flange, a pusher plate mounted for reciprocating movement in said hopper, a power cylinder connected between said bar and said pusher plate for reciprocating said plate in said hopper, and power means connected between said structure and the rearward end of said hopper and arranged to swing said hopper, said pusher plate, and said power cylinder upwardly about said pivot axis.

8. An earth moving vehicle comprising an elongate wheeled support structure, vertical support members mounted upon said support structure intermediate the ends of said structure and having means providing an elevated horizontal pivot axis extending transversely of said support structure, a hopper carried by said vertical support members, means mounting the upper forward end of said hopper for pivotal movement about said pivot axis, a pair of lifter arms pivotally mounted on said hopper, one arm being located along the outer surface of each side wall of said hopper, a first power cylinder connected between each lifter arm and said hopper for pivoting said arm relative to the hopper, a loading blade pivotally carried between the forward ends of said lifter arms, a second power cylinder connected between each lifter arm and said blade for pivoting the blade relative to said lifter arms, a pusher plate slidably disposed for reciprocating movement in said hopper, and actuating means connected between said pusher plate and said hopper for reciprocating said plate in the hopper.

9. An earth moving vehicle comprising an elongate wheeled support structure, vertical support members mounted upon said support structure intermediate the ends of said structure and having means providing an elevated horizontal pivot axis extending transversely of said support structure, a hopper carried by said vertical support members, means mounting the upper forward end of said hopper for pivotal movement about said pivot axis, a pair of lifter arms pivotally mounted on said hopper, one arm being located along the outer surface of each side wall of said hopper, a first power cylinder connected between each lifter arm and said hopper for pivoting said arm relative to the hopper, a loading blade pivotally carried between the forward ends of said lifter arms, a second power cylinder connected between each lifter arm and said blade for pivoting the blade relative to said lifter arms, a pusher plate slidably disposed for reciprocating movement in said hopper, actuating means connected between said pusher plate and said hopper for reciprocating said plate in the hopper, and means connected between said hopper and said support structure for swinging upwardly as a unit said hopper and said lifting arms, power cylinders, loading blade, pusher plate and pusher plate actuating means carried on said hopper.

10. An earth moving vehicle comprising a support; forward ground wheels mounting said support for earth traversing movement along a predetermined path of travel, said forward wheels having a forward axis of rotation extending transversely of said path; rear ground engaging wheels; means mounting said rear wheels on said support with the axis of rotation of the rear wheels in rearwardly spaced substantially parallel relation to said forward axis; a hopper having a forward portion, a floor projecting rearward from said forward portion, and side walls upstanding from said floor and also projecting rearward from said forward portion; means mounting said hopper on said support for elevational movement about a substantially horizontal axis in forwardly spaced parallel relation to said rear axis between lower digging and scraping positions between said rear wheels wherein said forward portion is located between said front and rear axes of rotation and wherein said floor declines rearward from said forward portion and alongside of said rear wheels, and an upper unloading position wherein said forward portion is positioned directly over the space between said front and rear wheels and wherein said floor inclines rearward from said forward portion in upwardly spaced relation to said rear wheels and projects rearward of said rear wheels; powered means connected to said hopper for raising and lowering it between said upper and lower positions; and means mounted within said hopper for movement toward and away from said forward portion for engaging earth in said hopper and moving it longitudinally thereof.

11. The vehicle of claim 10 wherein said earth engaging means is a pusher plate mounted within said hopper in substantially parallel relation to said forward portion and for reciprocating movement toward and away from said forward portion for unloading earth from said hopper in said upper position thereof; and including a power cylinder and piston rod connected between said support and said pusher plate for imparting said reciprocating movement to said plate.

12. In an earth moving vehicle, an elongated earth carrying hopper having a forward end portion, an open rear end portion, a floor extending between said forward and rear end portions and terminating in a lower rear edge at said rear end portion, and opposite sides upstanding from said floor and extending between said end portions; ground engaging means; means mounting said forward end portion of the hopper on said ground engaging means for elevational movement of said hopper, about a horizontal pivot axis extending transversely of said hopper, between a lower position with said floor sloping downward with respect to said pivot axis and an upper position with the said floor sloping upward with respect to said axis; a pair of rear wheels having peripheral portions circumscribing the axes of rotation of said rear wheels and opposite inner and outer surfaces, said pivot axis being in fixed forwardly spaced relation to said rear wheel axes, said mounting means being supported on said rear wheels with the axes of rotation of the rear wheels extending transversely of said hopper between said forward and rear end portions of the hopper and with said inner surfaces facing inwardly of said vehicle and in spaced relation to each other; power operated means connected to said mounting means for elevationally moving the hopper with respect to said rear wheels between said upper position wherein said floor is spaced above said upwardly disposed peripheral portions of said rear wheels and said lower position wherein said hopper is positioned between said rear wheels with the inner surfaces of said wheels in closely adjacent confronting relation to corresponding sides of said hopper; and a pusher plate mounted within said hopper for reciprocating movement between said forward end portion and said open rear end portion for pushing earth out of said hopper when the hopper is in said upper position.

13. In an earth moving vehicle, a support having front and rear portions and a lengthwise dimension extending from said front portion to said rear portion; forward ground wheels mounting said support for earth traversing movement along a predetermined path of travel, said forward wheels having a forward axis of rotation extending transversely of said path; rear ground engaging wheels; means mounting said rear wheels on said support with the axis of rotation of the rear wheels in rearwardly spaced substantially parallel relation to said forward axis; a hopper having a forward portion, a floor projecting rearwardly from said forward portion, and side walls upstanding from said floor and also projecting rearward from said forward portion; means mounting said hopper on said support with said forward portion located generally between said forward and rear axes of rotation and for elevational movement of said hopper about a substantially horizontal axis in forwardly spaced substantially parallel relation to said rear axis and with said substantially horizontal axis being fixed against movement lengthwise of and with respect to said support, said hopper being elevationally movable from a lower position disposed between said rear wheels wherein said floor declines rearward from said forward portion and alongside of said rear wheels, to an upper position wherein said floor inclines rearward from said forward portion in upwardly spaced relation to said rear wheels and projects rearward of said rear wheels; means in said hopper for pushing the contents thereof rearwardly out of said hopper when said hopper is in its upper position and powered means connected to said hopper for raising and lowering it between said upper and lower positions.

14. The vehicle of claim 13 wherein said substantially horizontal axis is at a fixed position above and between said forward and rear wheels.

15. An earth moving vehicle comprising a wheeled support structure, a hopper supported on said structure and having a forward end disposed intermediate the ends of said structure and having an open rearward end disposed adjacent the rearward end of said structure, a slidable pusher plate disposed in upright position in said hopper and mounted for movement from a position adjacent the forward end of said hopper to a position adjacent the rearward end to push material out the open rearward end of said hopper, mounting means at the upper forward end of said hopper, means pivotally connecting said hopper mounting means to said support structure for pivoting movement about a horizontal axis located adjacent the upper forward ends of the side walls of the hopper, first power means connected between said support structure and said hopper for pivoting said hopper about said axis to elevate the rearward open end of said hopper from a position in which the rear edge of the hopper floor is below grade to a position in which the rear edge of the floor is above said axis and the hopper is upwardly inclined from said axis, and second power means connected between said hopper and said slidable pusher plate for moving said plate rearwardly while the rearward end of the hopper is elevated to force material in said hopper out the open rearward end thereof.

References Cited by the Examiner
UNITED STATES PATENTS

| | | | |
|---|---|---|---|
| 1,340,247 | 5/1920 | Petersen | 37—126 |
| 1,407,486 | 2/1922 | Sandberg | 37—1.8 |
| 1,826,915 | 10/1931 | Wooster | 37—4 |
| 2,249,356 | 7/1941 | Goodman | 37—126 |
| 2,263,028 | 11/1941 | Brownell | 37—124 |
| 2,597,496 | 5/1952 | Jeffrey | 214—82 |
| 2,619,242 | 11/1952 | Crampton et al. | 214—82 |
| 2,702,438 | 2/1955 | Ballu | 37—126 |
| 2,795,872 | 6/1957 | Wardle | 214—510 |
| 2,835,397 | 5/1958 | Wagner | 214—140 |
| 2,907,125 | 10/1959 | Gardner | 37—124 |
| 2,970,707 | 2/1961 | Wagner et al. | 214—140 |
| 2,979,215 | 4/1961 | Brisson | 214—510 |
| 3,063,173 | 11/1962 | Wardle | 37—126 |

ABRAHAM G. STONE, *Primary Examiner.*

E. A. FALLER, R. A. DOUGLAS, A. L. LAPONT, R. C. RIORDON, *Examiners.*

BENJAMIN HERSH, WILLIAM A. SMITH, III, A. J. MAKAY, A. J. BECK, W. B. STONE,
*Assistant Examiners.*